15

United States Patent
Sun

(10) Patent No.: US 9,438,072 B2
(45) Date of Patent: Sep. 6, 2016

(54) SERVER

(71) Applicants: Inventec (Pudong) Technology Corporation, Shanghai (CN); INVENTEC CORPORATION, Taipei (TW)

(72) Inventor: Yan-Long Sun, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 544 days.

(21) Appl. No.: 14/071,381

(22) Filed: Nov. 4, 2013

(65) Prior Publication Data

US 2014/0292083 A1    Oct. 2, 2014

(30) Foreign Application Priority Data

Mar. 28, 2013    (CN) .......................... 2013 1 0105851

(51) Int. Cl.
*H02M 3/156*    (2006.01)
*H02J 9/00*    (2006.01)
*G06F 1/32*    (2006.01)

(52) U.S. Cl.
CPC ................. *H02J 9/005* (2013.01); *G06F 1/32* (2013.01); *G06F 1/3234* (2013.01); *G06F 1/3287* (2013.01); *H02J 9/00* (2013.01); *Y10T 307/406* (2015.04)

(58) Field of Classification Search
CPC ...... G06F 1/3287; G06F 1/3234; G06F 1/32; Y10T 307/406; H02J 9/00
USPC .......................................................... 307/31
See application file for complete search history.

(56) References Cited

U.S. PATENT DOCUMENTS

| 6,259,304 B1* | 7/2001 | Sheng .................. G06F 1/3203 327/408 |
| 2006/0155395 A1* | 7/2006 | Lim ..................... G05B 19/042 700/22 |
| 2010/0281281 A1* | 11/2010 | Humphrey ............ G06F 1/3203 713/323 |
| 2014/0281630 A1* | 9/2014 | Chien .................. G06F 1/3287 713/323 |

* cited by examiner

*Primary Examiner* — Rexford Barnie
*Assistant Examiner* — Terrence Willoughby
(74) *Attorney, Agent, or Firm* — Maschoff Brennan

(57) ABSTRACT

A server includes a power module, a detection circuit, a switching circuit, at least one first electric component and at least one second electric component. The power module supplies a standby voltage under a standby mode and supplies a working voltage under a working mode. The detection circuit receives a working mode signal of the server to output a control signal. The working mode signal specifies that the server is under the standby mode or the working mode. The switching circuit is supplied with the working voltage, the standby voltage and a converted control signal generated by converting the control signal, to transfer either the working voltage or the standby voltage. The first electric component works under the working mode only. The second electric component works under the standby mode and the working mode.

8 Claims, 2 Drawing Sheets

SERVER

CROSS-REFERENCE TO RELATED APPLICATIONS

This non-provisional application claims priority under 35 U.S.C. §119(a) on Patent Application No(s). 201310105851.8 filed in China on Mar. 28, 2013, the entire contents of which are hereby incorporated by reference.

BACKGROUND OF THE INVENTION

1. Technical Field of the Invention

The disclosure relates to a server, more particularly to a server having the lower power consumption and the higher efficiency of power supplying.

2. Description of the Related Art

In general, an electric device requires multiple power sources to supply multiple working voltages, and these power sources are embodied by using different transformers taking up a lot of space. In order to efficiently reduce the volume of the electric device, a power supply has been invented to supply the multiple working voltages for the server.

Most power supplies cannot select one of voltages to supply, so multiple voltages may be supplied at the same time. For instance, integrated circuit (IC) chips disposed in the server require several DC voltages, i.e. standby voltages, for their works under a standby mode, and after being booted, the server will switch to a working mode from the standby mode and require another DC voltage, i.e. a working voltage. Herein, not only the working voltage but also the standby voltages are supplied to the server under the working mode. This will cause more power consumption and reduce the efficiency of power supplying.

SUMMARY OF THE INVENTION

According to an embodiment of the disclosure, a server includes a power module, a detection circuit, a switching circuit, at least one first electric component and at least one second electric component. The power module supplies a standby voltage under a standby mode and supplies a working voltage under a working mode. The detection circuit coupled to the power module receives a working mode signal specifying whether the server is under the standby mode or the working mode, and according to a potential of the working mode signal, outputs a control signal. The switching circuit coupled to the detection circuit and the power module are supplied with the working voltage, the standby voltage and a converted control signal generated by converting the control signal, and according to the converted control signal, supplies either the working voltage or the standby voltage. The at least one first electric component coupled to the switching circuit works under the working mode only, and the at least one second electric component coupled to the switching circuit works under the standby mode and the working mode. When the server is under the standby mode, the switching circuit supplies the standby voltage to the second electric component according to the converted control signal. When the server is under the working mode, the switching circuit supplies the working voltage to the first electric component and the second electric component according to the converted control signal.

BRIEF DESCRIPTION OF THE DRAWINGS

The present disclosure will become more fully understood from the detailed description given herein below for illustration only, and thus does not limit the present disclosure, wherein.

DETAILED DESCRIPTION

Figure 1:
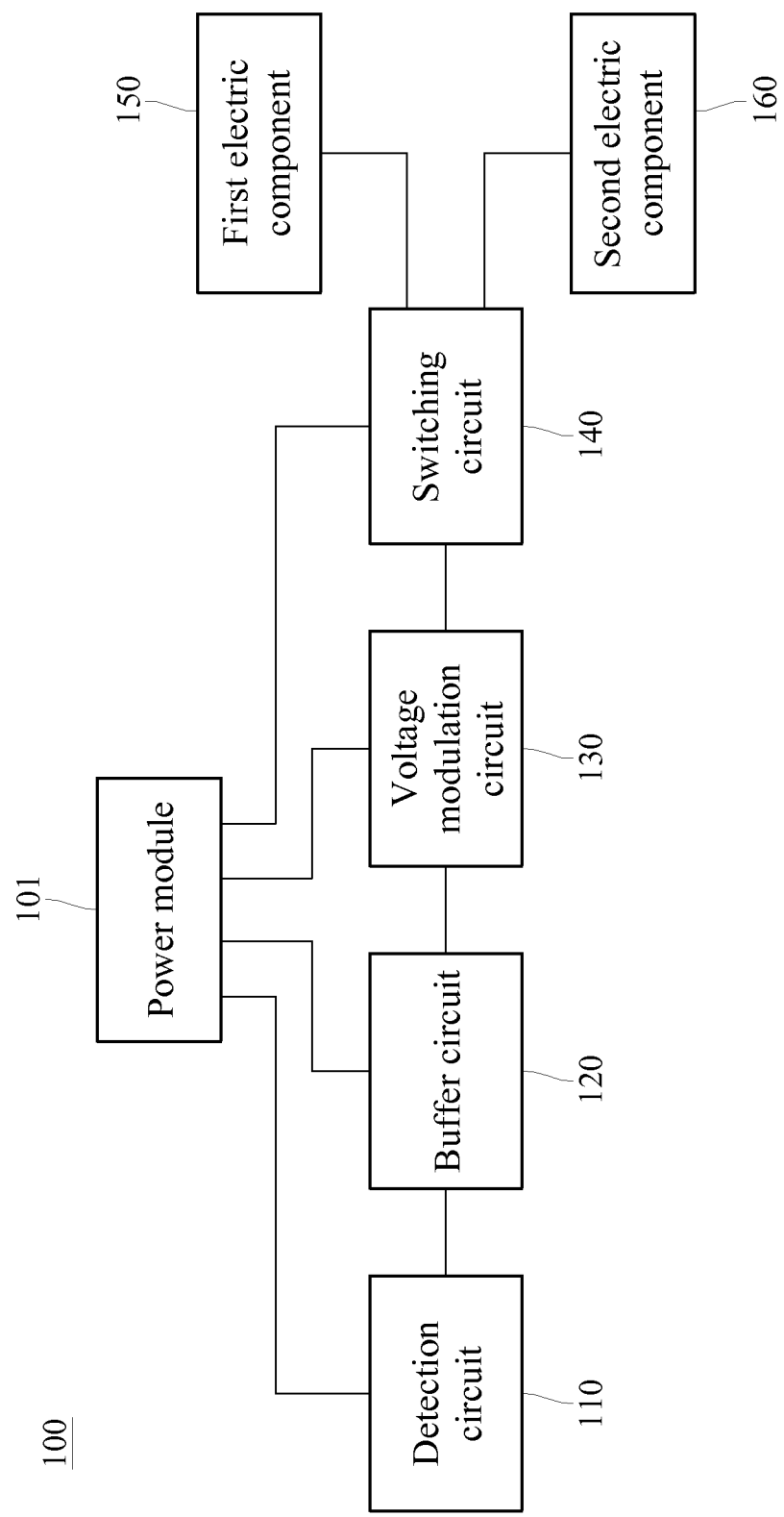
FIG. 1 is a schematic diagram of a server in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
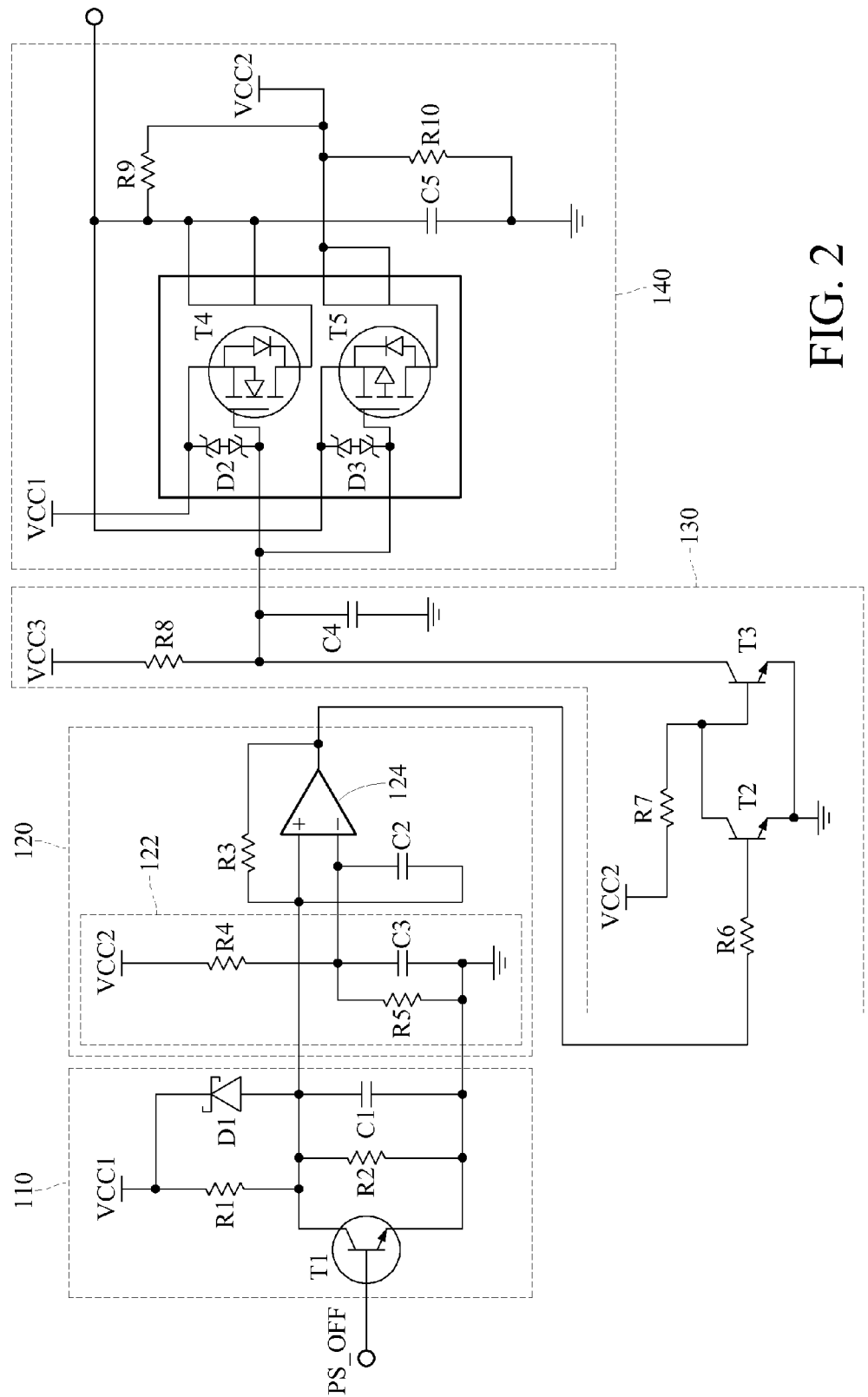
FIG. 2 is a schematic circuit diagram of the server in FIG. 1.

Refer to FIG. 1 and FIG. 2, a server 100 operates under either a standby mode or a working mode to supplies suitable power to its internal electric components. The working mode denotes that the server 100 is supplied with a DC voltage to perform its regular work. The server 100 includes a power module 101, a detection circuit 110, a switching circuit 140, one or more first electric components 150 and one or more second electric components 160, and the power module 101 supplies a standby voltage VCC2, i.e. P5V_STBY, under the standby mode and supplies a working voltage VCC1, e.g. P5V, under the working mode. Hereinafter, the disclosure takes one first electric components 150 and one second electric components 160 as an exemplary embodiment.

The detection circuit 110 couples to the power module 101, receives a working mode signal PS_OFF specifying whether the server 100 is under the standby mode or the working mode, and outputs a control signal according to the potential of the working mode signal PS_OFF. The detection circuit 110 includes a first transistor T1, a first resistor R1, a diode D1, a second resistor R2 and a first capacitor C1.

The first transistor T1 has a first end, a second end and a third end, the first end of the first transistor T1 receives the working mode signal PS_OFF, the second end of the first transistor T1 outputs the control signal, and the third end of the first transistor Ti is grounded. The first resistor R1 has a first end and a second end, the first end of the first resistor R1 is supplied with the working voltage VCC1, and the second end of the first resistor R1 couples to the second end of the first transistor T1. The diode D1 has an anode and a cathode, the anode of the diode D1 couples to the second end of the first resistor R1, and the cathode of the diode D1 couples to the first end of the first resistor R1. The second resistor R2 has a first end and a second end, the first end of the second resistor R2 couples to the second end of the first transistor T1, and the second end of the second resistor R2 is grounded. The first capacitor C1 has a first end and a second end, the first end of the first capacitor C1 couples to the first end of the second resistor R2, and the second end of the first capacitor C1 couples to the second end of the second resistor R2. For example, when the server 100 is under the standby mode, the working mode signal PS_OFF is at a high potential and can be used for turning on the first transistor T1, and then the detection circuit 110 outputs the control signal at a low potential. Alternately, when the server 100 is under the working mode, the working mode signal PS_OFF is at the low potential and can be used for turning off the first transistor T1, and then the detection circuit 110 outputs the control signal at the high potential.

The switching circuit 140 couples to the detection circuit 110 and the power module 101, is supplied with the working voltage VCC1 and the standby voltage VCC2, receives a converted control signal generated by converting the control signal, and according to the converted control signal, supplies either the working voltage VCC1 or the standby voltage VCC2. Specifically, the switching circuit 140 includes a fourth transistor T4, a fifth transistor T5, a ninth resistor R9, a tenth resistor R10 and a fifth capacitor C5. The fourth transistor T4 has a first end, a second end and a third end, the first end of the fourth transistor T4 receives the converted control signal, the second end of the fourth transistor T4 is supplied with the working voltage VCC1, and the third end of the fourth transistor T4 supplies the working voltage VCC1. The fifth transistor T5 has a first end, a second end and a third end, the first end of the fifth transistor T5 receives the converted control signal, the second end of the fifth transistor T5 supplies the standby voltage VCC2, and the third end of the fifth transistor T5 is supplied with the standby voltage VCC2. The ninth resistor R9 has a first end and a second end, the first end of the ninth resistor R9 couples to the third end of the fourth transistor T4, and the second end of the ninth resistor R9 couples to the third end of the fifth transistor T5. The tenth resistor R10 has a first end and a second end, the first end of the tenth resistor R10 couples to the second end of the ninth resistor R9, and the second end of the tenth resistor R10 is grounded. The fifth capacitor C5 has a first end and a second end, the first end of the fifth capacitor C5 couples to the first end of the ninth resistor R9, and the second end of the fifth capacitor C5 is grounded.

Moreover, the switching circuit 140 further includes a first bidirectional diode D2 and a second bidirectional diode D3. The first bidirectional diode D2 has a first end and a second end, the first end of the first bidirectional diode D2 couples to the second end of the fourth transistor T4, and the second end of the first bidirectional diode D2 couples to the first end of the fourth transistor T4. The second bidirectional diode D3 has a first end and a second end, the first end of the second bidirectional diode D3 couples to the second end of the fifth transistor T5, and the second end of the second bidirectional diode D3 couples to the first end of the fifth transistor T5.

For example, when the converted control signal is at the low potential, the fourth transistor T4 turns off and the fifth transistor T5 turns on, where the third end of fifth transistor T5 is supplied with the standby voltage VCC2. Herein, the second end of the fifth transistor T5 supplies the standby voltage VCC2. Alternately, when the converted control signal is at the high potential, the fourth transistor T4 turns on and the fifth transistor T5 turns off. The second end of the fourth transistor T4 is supplied with the working voltage VCC1, and the third end of the fourth transistor T4 supplies the working voltage VCC1.

The first electric component 150 couples to the switching circuit 140 and works under the working mode rather than the standby mode. The second electric component 160 couples to the switching circuit 140 and works under both of the standby mode and the working mode. In this and some embodiments, the first electric component 150 and the second electric component 160 can be IC chips or other loads.

For example, when the server 100 is under the standby mode, the switching circuit 140 supplies the standby voltage VCC2 to the second electric component 160 rather than the first electric component 150 according to the converted control signal. Alternately, when the server 100 is under the working mode, the switching circuit 140 supplies the working voltage VCC1 to the first electric component 150 and the second electric component 160 according to the converted control signal instead of powering the second electric component 160 with the standby voltage VCC2.

In this and some embodiments, the server 100 further includes a buffer circuit 120 and a voltage modulation circuit 130, and the buffer circuit 120 and the voltage modulation circuit 130 couple between the detection circuit 110 and the switching circuit 140. Specifically, the buffer circuit 120 couples to the detection circuit 110 and the power module 101 and receives and buffers the control signal, so as to output a buffer signal.

The buffer circuit 120 includes a reference voltage signal generator 122, a comparator 124, a third resistor R3 and a second capacitor C2. The reference voltage signal generator 122 is supplied with the standby voltage VCC2, so as to output a reference voltage signal. Specifically, the reference voltage signal generator 122 includes a fourth resistor R4, a fifth resistor R5 and a third capacitor C3. The fourth resistor R4 has a first end and a second end, the first end of the fourth resistor R4 is supplied with the standby voltage VCC2, and the second end of the fourth resistor R4 outputs the reference voltage signal. The fifth resistor R5 has a first end and a second end, the first end of the fifth resistor R5 couples to the second end of the fourth resistor R4, the second end of the fifth resistor R5 is grounded. The third capacitor C3 has a first end and a second end, the first end of the third capacitor C3 couples to the first end of the fifth resistor R5, and the second end of the third capacitor C3 is grounded. The comparator 124 has a first input end, a second input end and an output end, the first input end of the comparator 124 receives the control signal, the second input end of the comparator 124 receives the reference voltage signal, and the output end of the comparator 124 outputs the buffer signal. The third resistor R3 has a first end and a second end, the first end of the third resistor R3 couples to the first input end of the comparator 124, and the second end of the third resistor R3 couples to the output end of the comparator 124. The second capacitor C2 has a first end and a second end, the first end of the second capacitor C2 couples to the second input end of the comparator 124, and the second end of the second capacitor C2 couples to the first input end of the comparator 124.

For example, when the control signal is at the low potential, the potential at the first input end of the comparator 124 receiving the control signal is smaller than the potential at the second input end of the comparator 124 receiving the reference voltage signal. Herein, the output end of the comparator 124 will output the buffer signal at the low potential. When the control signal is at the high potential, the potential at the first input end of the comparator 124 receiving the control signal is larger than the potential at the second input end of the comparator 124 receiving the reference voltage signal. Herein, the output end of the comparator 124 will output the buffer signal at the high potential.

The voltage modulation circuit 130 couples to the buffer circuit 120 and the power module 101, receives the buffer signal, and modulates the potential of the buffer signal to output the converted control signal. Specifically, the voltage modulation circuit 130 includes a sixth resistor R6, a second transistor T2, a seventh resistor R7, a third transistor T3, an eighth resistor R8 and a fourth capacitor C4. The sixth resistor R6 has a first end and a second end, and the first end of the sixth resistor R6 receives the buffer signal. The second transistor T2 has a first end, a second end and a third end, the first end of the second transistor T2 couples to the second end of the sixth resistor, the second end of the second transistor T2 output a conversion signal, and the third end of the second transistor T2 is grounded. The seventh resistor R7 has a first end and a second end, the first end of the seventh resistor R7 is supplied with the standby voltage VCC2, and the second end of the seventh resistor R7 couples to the second end of the second transistor T2. The third transistor T3 has a first end, a second end and a third end, the first end of the third transistor T3 receives the conversion signal, the second end of the third transistor T3 outputs the converted control signal, and the third end of the third transistor T3 is grounded. The eighth resistor R8 has a first end and a second end, the first end of the eighth resistor R8 is supplied with a voltage VCC3, e.g. P12V, the second end of the eighth resistor R8 couples to the second end of the third transistor T3. The fourth capacitor C4 has a first end and a second end, the first end of the fourth capacitor C4 couples to the second end of the eighth resistor R8, and the second end of the fourth capacitor C4 is grounded.

For example, when the buffer signal is at the low potential, the second transistor T2 turns off. Herein, the second end of the second transistor T2 outputs the conversion signal at the high potential to the first end of the third transistor T3. Then, the third transistor T3 turns on, where the second end of the third transistor T3, i.e. the voltage modulation circuit 130, outputs the converted control signal at the low potential. When the buffer signal is at the high potential, the second transistor T2 turns on, where the second end of the second transistor T2 outputs the conversion signal at the low potential to the first end of the third transistor. Then, the third transistor T3 turns off, where the second end of the third transistor T3, i.e. the voltage modulation circuit 130, outputs the converted control signal at the high potential.

In the disclosure, the first transistor T1, the second transistor T2 and the third transistor T3 are, for example, NPN bipolar junction transistors (BJTs), PNP BJTs, metal oxide semiconductor field effect transistors (MOSFETs) or other similar components. In FIG. 2, the three transistors are NPN BJTs, where the first to third ends of each of the three transistors are the base end, the collector end and the emitter end respectively. Moreover, the fourth transistor T4 and the fifth transistor T5 are, for example, N-type transistors, P-type transistors or other similar components. In FIG. 2, the fourth transistor T4 and the fifth transistor T5 are respectively the N-type transistor and the P-type transistor, where the first to third ends of the fourth transistor T4 are the gate end, the drain end and the source end respectively and the first to third ends of the fifth transistor T5 are respectively the gate end, the source end and the drain end. The comparator 124 is, for example, an operational amplifier or other similar component.

As set forth above, the server can supply suitable voltages according to its current state. Specifically, the server utilizes the detection circuit to receive the working mode signal specifying the current state of the server to generate the control signal, and then utilizes the switching circuit to receive the converted control signal generated by converting the control signal, so as to transfer either the working voltage or the standby voltage. In other word, the server under the standby mode supplies the standby voltage, and under the working mode supplies the working voltage. In this way, the server may have the lower power consumption and the higher efficiency of power supplying.

What is claimed is:

1. A server, comprising:
a power module, configured to supply a standby voltage under a standby mode and supply a working voltage under a working mode;
a detection circuit, coupled to the power module and configured to a working mode signal specifying whether the server is under the standby mode or the working mode, and output a control signal according to a potential of the working mode signal;
a switching circuit, coupled to the detection circuit and the power module and configured to be supplied with the working voltage, the standby voltage and a converted control signal generated by converting the control signal, and according to the converted control signal, supply either the working voltage or the standby voltage;
at least one first electric component, coupled to the switching circuit and configured to work under the working mode only; and
at least one second electric component, coupled to the switching circuit and configured to work under both of the standby mode and the working mode,
wherein when the server is under the standby mode, the switching circuit supplies the standby voltage to the second electric component according to the converted control signal, and when the server is under the working mode, the switching circuit supplies the working voltage to the first electric component and the second electric component according to the converted control signal.

2. The server according to claim 1, wherein the detection circuit comprises:
a first transistor having a first end which is configured to receive the working mode signal, a second end which is configured to output the control signal, and a third end which is grounded;
a first resistor having a first end which is configured to be supplied with the working voltage, and a second end which couples to the second end of the first transistor;
a diode having an anode which couples to the second end of the first resistor, and a cathode which couples to the first end of the first resistor;
a second resistor having a first end which couples to the second end of the first transistor, and a second end which is grounded; and
a first capacitor having a first end which couples to the first end of the second resistor, and a second end, and a second end which couples to the second end of the second resistor.

3. The server according to claim 1, further comprising:
a buffer circuit, coupled to the detection circuit and the power module and being configured to receive and buffer the control signal to output a buffer signal; and
a voltage modulation circuit, coupled to the buffer circuit and the power module and configured to receive the buffer signal and modulate a potential of the buffer signal to output the converted control signal.

4. The server according to claim 3, wherein the buffer circuit comprises:
a reference voltage signal generator, configured to be supplied with the standby voltage, and according to the standby voltage, to output a reference voltage signal;
a comparator having a first input end for receiving the control signal, a second input end for receiving the reference voltage signal, and an output end for outputting the buffer signal;

a third resistor having a first end coupled to the first input end of the comparator, and a second end coupled to the output end of the comparator; and a second capacitor, having a first end which is coupled to the second input end of the comparator, and a second end which is coupled to the first input end of the comparator.

5. The server according to claim 4, wherein the reference voltage signal generator comprises:

a fourth resistor having a first end for being supplied with the standby voltage, and a second end for outputting the reference voltage signal;

a fifth resistor having a first end coupled to the second end of the fourth resistor, a second end grounded; and a third capacitor having a first end coupled to the first end of the fifth resistor, and a second end grounded.

6. The server according to claim 3, wherein the voltage modulation circuit comprises:

a sixth resistor having a first end for receiving the buffer signal, and a second end;

a second transistor having a first end coupled to the second end of the sixth resistor, a second end for outputting a conversion signal, and a third end grounded;

a seventh resistor having a first end for being supplied with the standby voltage, and a second end coupled to the second end of the second transistor;

a third transistor having a first end for receiving the conversion signal, a second end for outputting the converted control signal, and a third end grounded;

an eighth resistor having a first end for being supplied with a voltage, and a second end coupled to the second end of the third transistor; and a fourth capacitor having a first end and coupled to the second end of the eighth resistor, a second end grounded.

7. The server according to claim 1, wherein the switching circuit comprises:

a fourth transistor having a first end for receiving the converted control signal, a second end for being supplied with the working voltage, and a third end for supplying the working voltage;

a fifth transistor having a first end for receiving the converted control signal, a second end for supplying the standby voltage, a third end for being supplied with the standby voltage;

a ninth resistor having a first end coupled to the third end of the fourth transistor, and a second end coupled to the third end of the fifth transistor;

a tenth resistor having a first end coupled to the second end of the ninth resistor, and a second end grounded; and a fifth capacitor having a first end coupled to the first end of the ninth resistor, and a second end grounded.

8. The server according to claim 7, wherein the switching circuit further comprises:

a first bidirectional diode having a first end coupled to the second end of the fourth transistor, and a second end coupled to the first end of the fourth transistor; and a second bidirectional diode having a first end coupled to the second end of the fifth transistor, and a second end coupled to the first end of the fifth transistor.

* * * * *